United States Patent
Horikoshi

(10) Patent No.: US 7,701,840 B2
(45) Date of Patent: Apr. 20, 2010

(54) MULTIPLEX SWITCHING

(75) Inventor: Shuhei Horikoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 426 days.

(21) Appl. No.: 11/714,820

(22) Filed: Mar. 7, 2007

(65) Prior Publication Data
US 2007/0211766 A1    Sep. 13, 2007

(30) Foreign Application Priority Data
Mar. 8, 2006    (JP) .............. 2006-062474

(51) Int. Cl.
*H04J 11/00* (2006.01)
(52) U.S. Cl. .................................... 370/208
(58) Field of Classification Search .............. None
See application file for complete search history.

(56) References Cited

U.S. PATENT DOCUMENTS

| | | | | |
|---|---|---|---|---|
| 3,715,508 A | * | 2/1973 | Blasbalg | 370/203 |
| 5,838,680 A | * | 11/1998 | Noiri et al. | 370/395.7 |
| 5,910,950 A | * | 6/1999 | ten Brink | 370/342 |
| 6,477,157 B1 | * | 11/2002 | Kim et al. | 370/331 |
| 6,628,605 B1 | * | 9/2003 | Chang | 370/208 |
| 2002/0006176 A1 | * | 1/2002 | Motojima | 375/368 |
| 2002/0023191 A1 | * | 2/2002 | Fudeyasu | 711/104 |
| 2004/0223763 A1 | * | 11/2004 | Lee et al. | 398/78 |
| 2005/0163238 A1 | * | 7/2005 | Fujii | 375/260 |
| 2006/0189310 A1 | * | 8/2006 | Sherman | 455/428 |

FOREIGN PATENT DOCUMENTS

| | | |
|---|---|---|
| JP | 8-56228 | 2/1996 |
| JP | 2000-92126 | 3/2000 |
| JP | 2004-254332 | 9/2004 |

* cited by examiner

*Primary Examiner*—Chirag G Shah
*Assistant Examiner*—Amarnauth Persaud
(74) *Attorney, Agent, or Firm*—McGinn IP Law Group, PLLC

(57) ABSTRACT

Multiplex switching is disclosed for readily multiplexing and switching packet data without causing a delay. Bit widths of packets supplied from a plurality of input channels are unified to a previously set bit width. The packets unified in bit width are synchronized among the plurality of input channels. The synchronized packets are spread by multiplying them by orthogonal codes based on the input channels. The spread packets are multiplexed, and multiplexed packets are multiplied respectively by orthogonal codes for switching according to the input channels on which the packets delivered to output channels have been supplied, to reconstruct the packets supplied from the input channels. The packets are then delivered to the output channels.

23 Claims, 6 Drawing Sheets

US 7,701,840 B2

MULTIPLEX SWITCHING

BACKGROUND OF THE INVENTION

1. Field of the Invention

The present invention relates to a multiplex switching circuit and a multiplex switching method for multiplexing input packets on a plurality of channels for switching in a base station or the like of a W-CDMA (Wideband-Code Division Multiple Access) radio communications system.

2. Description of the Related Art

Conventionally, in radio communications systems such as a digital portable telephone, a packet transmission apparatus for transmitting packets on a plurality of channels is required to provide high throughput performance for processing a larger amount of small packets supplied thereto at a lower cost. However, when an increased number of channels are supplied at the same time, if a burst of input packets occurs, the packets will stagnate in an internal RAM (buffer) which is used for temporarily storing input packets. Then, when the stagnation of packets results in a scarcity of RAM area, packets can no longer be stored in the internal RAM, possibly causing a delay in processing, buffer overflow, and the like.

As illustrated in FIG. 1, in a conventional packet transmission apparatus, packets on a plurality of channels are multiplexed and stored in RAM 601 provided within the packet transmission apparatus. Thus, when packets are supplied to each channel in a bursty manner, the packets will stagnate in RAM 601 because output processing cannot keep up with packets supplied into RAM 601 if attention is paid to a certain time.

For this reason, the conventional packet transmission apparatus is required to have a large-capacity storage area for storing packets in the event that loads are concentrated in a network having a large number of input and output channels co-exist. If the capacity of RAM can be increased for use as a storage area, packets can be stored therein even if a burst of input packets occurs.

However, it is difficult to infinitely increase the capacity of RAM due to the limitations of price, circuit scale and the like of devices.

On the other hand, if the output throughput can be increased, packets can be sent out without stagnating in internal RAM, thus eliminating the need for increasing the capacity of internal RAM. However, since the output throughput is determined based on the operation frequency of an internal circuit, it is difficult to infinitely increase the output throughput due to limitations in the operation frequency.

To address the foregoing problem, JP2005-020609A discloses a method for managing the storage area of memory in order to temporarily store data in an apparatus connected to a network, and in order to limit input data when free capacity is reduced in the storage area.

However, although the method disclosed in the foregoing patent document can solve the problem of packet data overflow in the apparatus, there is still a problem that packet data will stagnate in the preceding apparatus, so that the capacity of RAM must be increased in the preceding apparatus. In addition, since the location in which packet data is stored simply moves from the apparatus of interest to the preceding apparatus, the disclosed method fails to solve a problem of eliminating a delay in data transmission.

SUMMARY OF THE INVENTION

It is an object of the present invention to provide a multiplex switching circuit and a multiplex switching method which are capable of readily multiplexing and switching packet data without causing any delay.

In the present invention, the bit widths of packets supplied from a plurality of input channels are unified to a previously set bit width. The packets having unified bit widths are synchronized among the plurality of input channels. The synchronized packets are spread by multiplying them by orthogonal codes based on the input channels. The spread packets are multiplexed, and multiplexed packets are multiplied by orthogonal codes for switching according to the input channels on which the packets delivered to output channels have been supplied, to reconstruct the packets supplied from the input channels.

In this way, even when the incoming packet rate exceeds the output throughput, or even when packets are temporarily stored in memory such as RAM for absorbing the excessive rate, multiplexed packets are processed without increasing the processing time and the RAM area for storing the multiplexed packets. Then, packet data can be readily multiplexed and switched without causing any delay.

The above and other objects, features, and advantages of the present invention will become apparent from the following description with reference to the accompanying drawings which illustrate an example of the present invention.

DETAILED DESCRIPTION OF THE PREFERRED EMBODIMENTS

Figure 2:
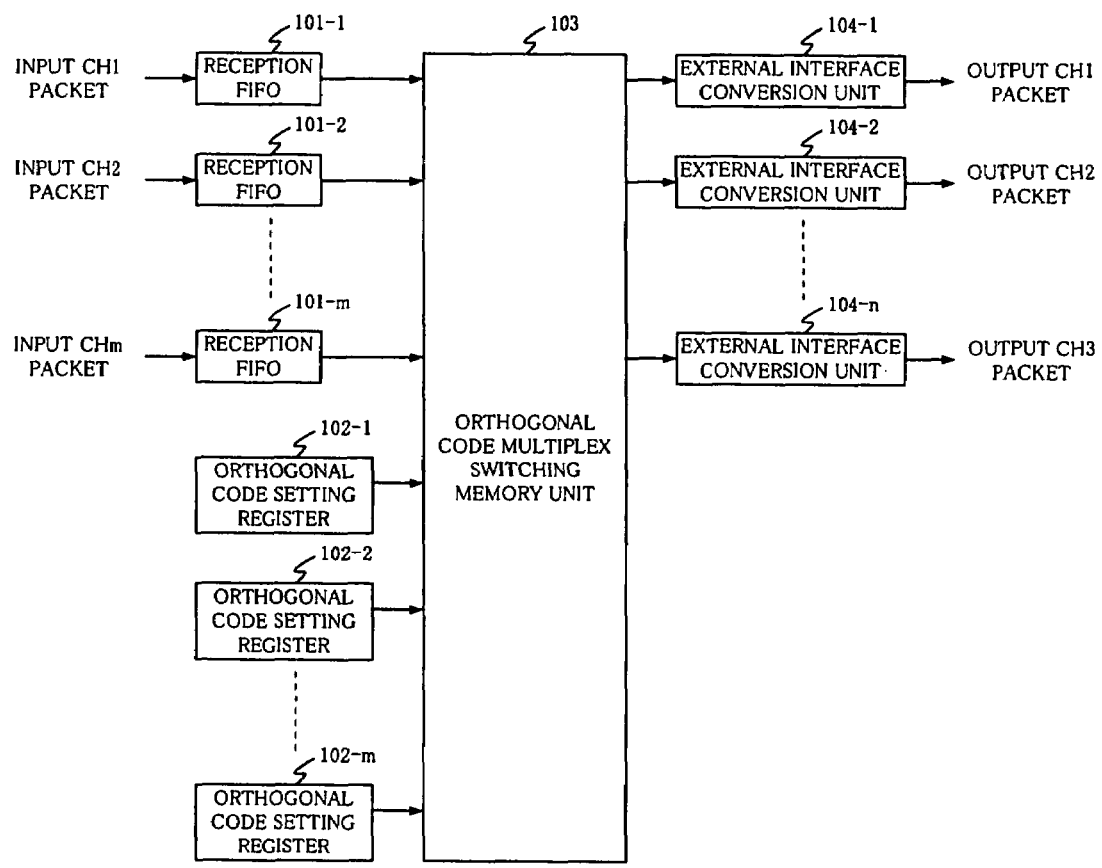
FIG. 2 is a diagram illustrating one embodiment of a multiplex switching circuit according to the present invention.

Referring to FIG. 2, there is illustrated an embodiment of a multiplex switching circuit which comprises reception FIFOs 101-1 to 101-*m*; orthogonal code setting resisters 102-1 to 102-*m*; orthogonal code multiplex switching memory unit 103; external interface conversion units 104-1 to 104-*n*.

Reception FIFOs 101-1 to 101-*m* are Fast-In Fast-Out memories each for temporarily storing input packets on channel CH1 to CHm, and for reading the input packets in accordance with the timing of an internal clock in order to synchronize the input packets with the internal clock. Orthogonal code setting registers 102-1 to 102-*m* are registers each for setting therein an orthogonal code (Gold code, Walsh-Hadamard code or the like) for spreading input packets in corresponding channels, and a orthogonal code for switching for reconstructing output packets in corresponding channels. In this connection, the orthogonal codes and orthogonal codes for switching can be freely set in accordance with the number of simultaneously used channels and in accordance with the bit width (code length) of the memories. Orthogonal code multiplex switching memory unit 103 spreads the packets sent from reception FIFOs 101-1 to 101-*m* using the orthogonal codes set in orthogonal code setting registers 102-1 to 102-*m*. Orthogonal code multiplex switching memory unit 103 also multiplexes the spread packets, temporarily stores the multiplexed packets, and reconstructs the temporarily stored packets using the orthogonal codes for switching set in orthogonal code setting registers 102-1 to 102-*m*. External interface conversion units 104-1 to 104-*n* convert the packets processed in orthogonal code multiplex switching memory unit 103 into packets having formats that correspond to the respective external interfaces connected to the outside. Here, while the CH number normally begins with zero, input CH numbers are labeled 1 to m, and output CH numbers are labeled 1 to n for convenience of description.

Figure 3:
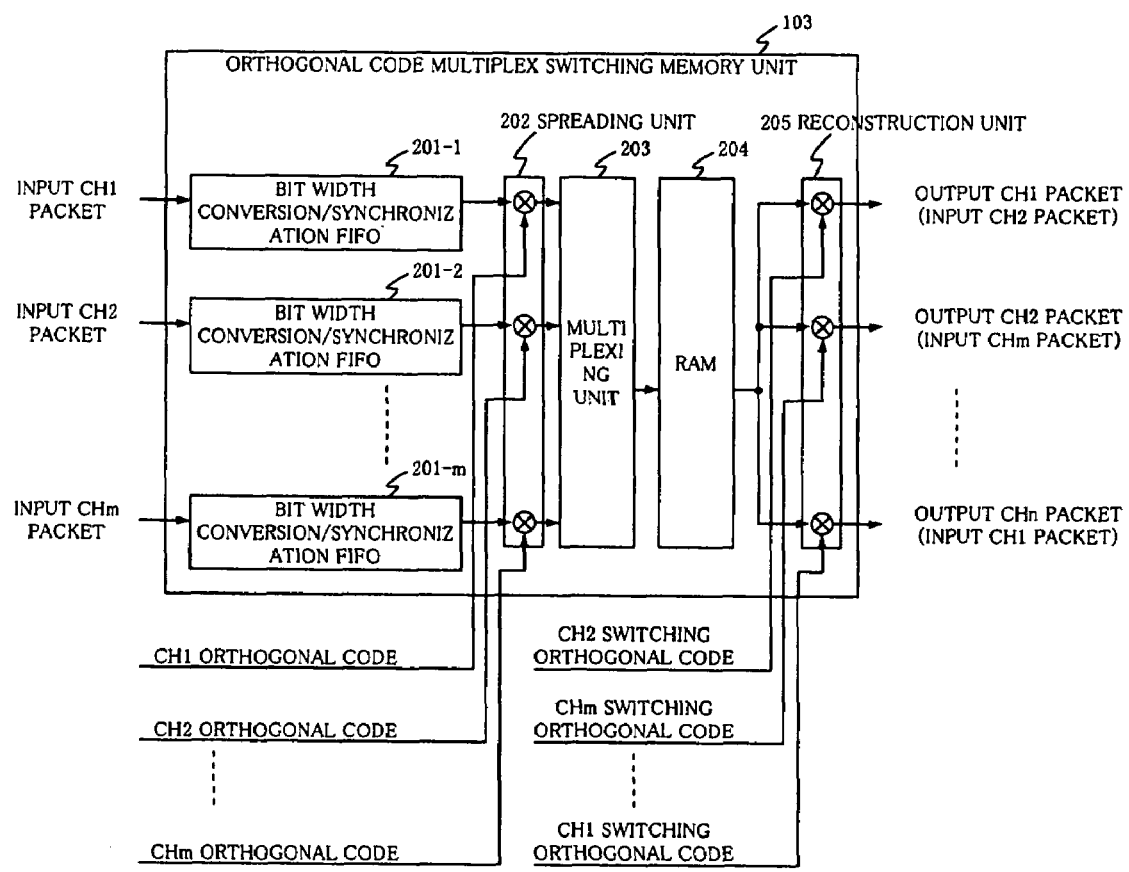
FIG. 3 is a diagram illustrating an exemplary configuration of an orthogonal code multiplex switching memory unit shown in FIG. 2.

Orthogonal code multiplex switching memory unit 103 illustrated in FIG. 2 comprises bit width conversion/synchronization FIFOs 201-1 to 201-*m*; spreading unit 202; multiplexing unit 203; RAM 204; and reconstruction unit 205, as illustrated in FIG. 3. Bit conversion/synchronization FIFOs 201-1 to 201-*m* establish synchronization among channels of input packets using FIFO (First-In First-Out) memories, and unify bit widths of the packets in order to write the packets of the same bit width into internal circuits. Spreading unit 202 spreads the packets which have undergone synchronization among channels and conversion of bit width in bit width conversion/synchronization FIFOs 201-1 to 2-1-*m* using the orthogonal codes set in orthogonal code setting registers 102-1 to 102-*m* shown in FIG. 2. Multiplexing unit 203 multiplexes the packets which have been spread in spreading unit 202. RAM 204 temporarily stores the packets multiplexed in multiplexing unit 203. Reconstruction unit 205 performs a switching operation by reading the packets temporarily stored in RAM 204, multiplying the read packets by orthogonal codes for switching that correspond to the destinations of the outputs, which are set in orthogonal code setting registers 102-1 to 102-*m* shown in FIG. 2, and extracting desired packets. It should be noted that RAM 204 is provided for stagnated packets when an incoming packet rate exceeds the throughput, so that RAM 204 is not required when the output throughput exceeds the incoming packet rate.

Figure 4:
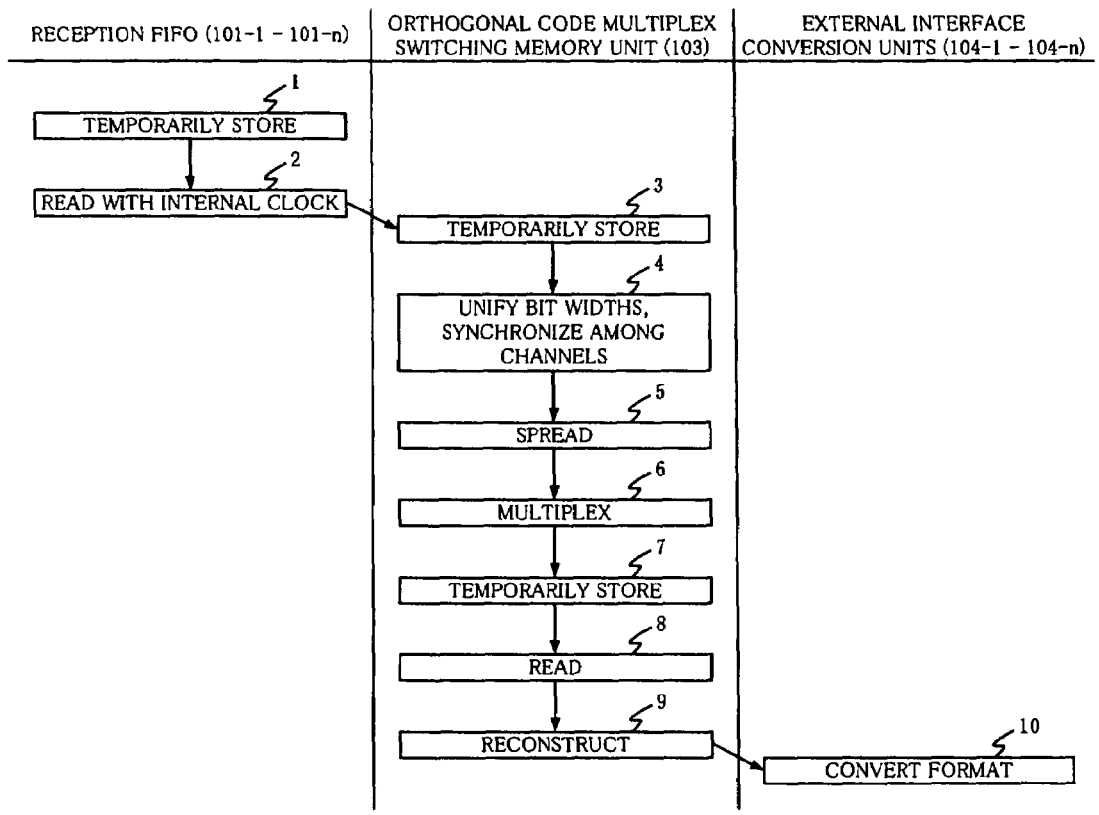
FIG. 4 is a sequence diagram for describing a multiplex switching method in the multiplex switching circuit illustrated in FIGS. 2 and 3.

In the following, a multiplex switching method in the multiplex switching circuit illustrated in FIGS. 2 and 3 will be described with reference to FIG. 4.

First, packets on input channels CH1 to CHm are deserialized by a SerDes circuit (not shown), and stored in reception FIFOs 101-1 to 101-*m*, respectively, at step 1. Then, the stored packets are read in accordance with the timing of the internal clock of the multiplex switching circuit according to the present invention at step 2. In other words, the packets are transferred from the external clock to the internal clock.

The packets read from reception FIFOs 101-1 to 101-*m* in accordance with the timing of the internal clock are temporarily stored in bit width conversion/synchronization FIFOs 201-1 to 201-*m* of orthogonal code multiplex switching memory unit 103 at step 3.

The packets temporarily stored in bit width conversion/synchronization FIFOs 201-1 to 201-*m* are unified to a previously set bit width.

Figure 5:
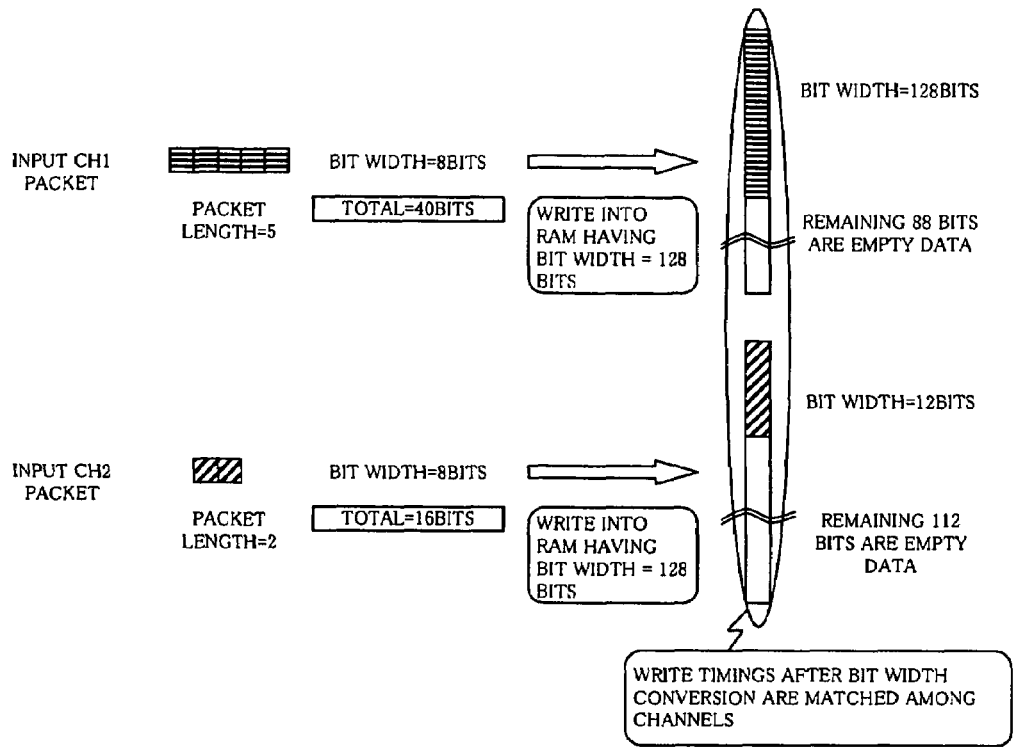
FIG. 5 is a diagram illustrating how to unify bit widths of packets which are temporarily stored in bit width conversion/synchronization FIFOs.

FIG. 5 illustrates an example in which a packet on input channel CH1 and a packet on input channel CH2 are unified to have a bit width of 128 bits. The packet on input channel CH1 has a total of 40 bits with a packet length equal to five and a bit width equal to eight bits. The packet on input channel CH2 in turn has a total of 16 bits with a packet length equal to two and a bit width equal to eight bits. Also, the previously set bit width is 128 bits, and residual bits in a packet are left empty. In this event, "0" may be inserted in the empty data bits. In the example illustrated in FIG. 5, because the total number of bits is equal to 40 in the packet on input CH1, the remaining 88 bits, except for these 40 bits, are left empty, thus constituting a packet of 128 bits. In the packet on input CH2, in turn, because the total number of bits is equal to 16, the remaining 112 bits, except for these 16 bits, are left empty, thus constituting a packet of 128 bits.

Also, when the packets having a unified bit width are read from bit width conversion/synchronization FIFOs 201-1 to 201-*m* at step 4, these packets are synchronized among the channels before they are read in order to match the starting positions of the packets which differed from one channel to another when they were stored in bit width conversion/synchronization FIFOs 201-1 to 201-*m*. For example, it is contemplated that a periodically read pulse may be generated by a timer, a counter or the like, such that the packets temporarily stored in bit width conversion/synchronization FIFOs 201-1 to 201-*m* are simultaneously read at the time when the periodically read pulse is applied to bit width conversion/synchronization FIFOs 201-1 to 201-*m*.

The packets read from bit width conversion/synchronization FIFOs 201-1 to 201-*m* are each spread by spreading unit 202 at step 5. Specifically, each of the orthogonal codes previously set in orthogonal code setting registers 102-1 to 102-*m*, as shown in FIG. 2 are multiplied by the packets read from bit width conversion/synchronization FIFOs 201-1 to 201-*m*, respectively.

The packets spread in spreading unit 202 are multiplexed in multiplexing unit 203 at step 6. In this event, since the packets applied to multiplexing unit 203 have been synchronized among the channels, multiplexing unit 203 multiplexes those packets, that have been sent out at the same time, in the order in which they were applied to multiplexing unit 203.

Then, the packets multiplexed in multiplexing unit 203 are temporarily stored in RAM 204 at step 7.

Figure 6:
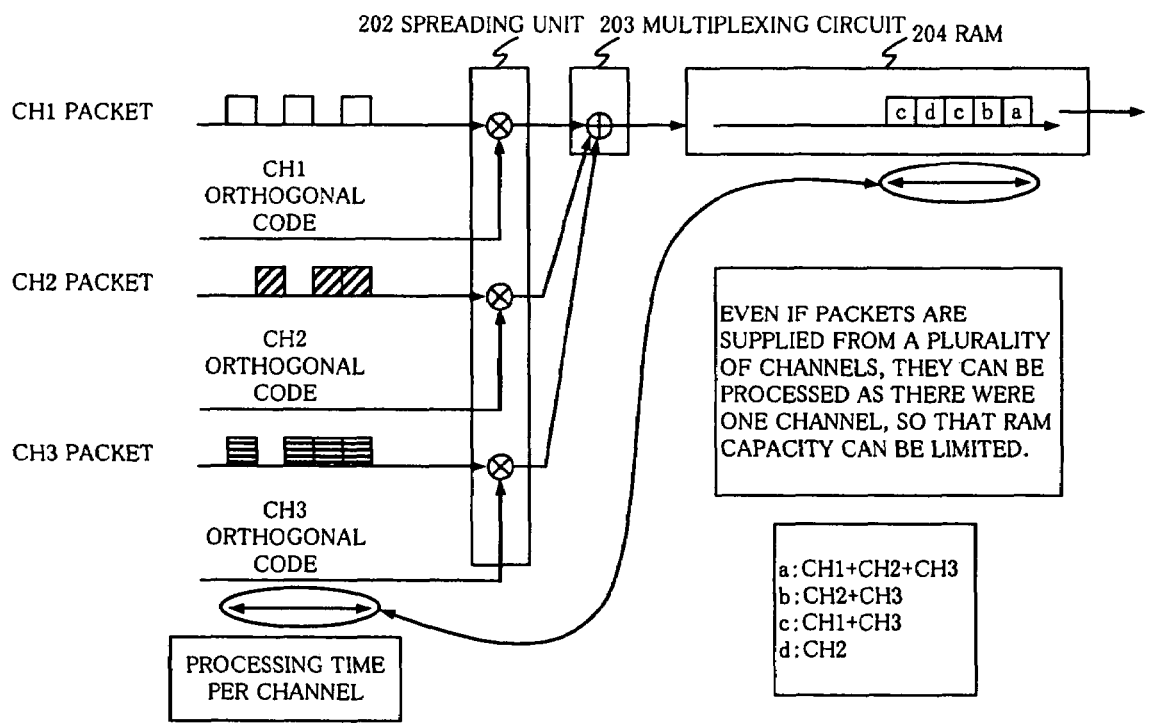
FIG. 6 is a diagram illustrating how packets are processed from step 5 to step 7 in FIG. 4.

FIG. 6 gives an example in which there are three channels CH1, CH2, CH3 on which packets are applied. After packets on these channels have been spread in spreading unit 202 and multiplexed in multiplexing unit 203, the packets are stored in RAM 204 in the form of a (CH1+CH2+CH3), b (CH2+CH3), c (CH1+CH3), and d (CH2) in respective time slots. In this way, the processing time required for processing them is equal to the processing time per channel.

Figure 1:
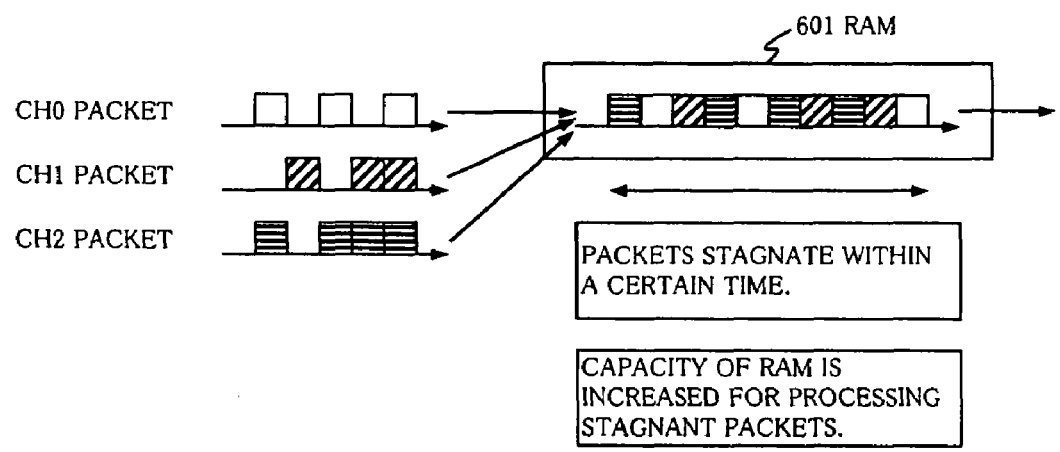
FIG. 1 is a diagram illustrating how packets are stored in a conventional packet transmission apparatus.

A comparison is now made between the process, according to the present invention illustrated in FIG. 6, and the conventional process illustrated in FIG. 1. In the conventional process, since packets from respective input channels are written into internal RAM 601 in the order in which the packets were supplied, a sufficient RAM area is required to store the incoming packets, and processing of the packets causes a delay. On the other hand, the process, according to the present invention, multiplexes packets among channels and therefore only requires a RAM area and a processing time for one channel, thus making it possible to increase the processing speed and reduce the cost by a reduction in RAM capacity. Here, an uneven use rate of the RAM area is contemplated among channels due to a burst of packets which can occur randomly on each channel. However, since RAM 204 can be shared through multiplexing to avoid an uneven use rate, the present invention is advantageous because of the high efficiency with which RAM 204 is used. It is therefore possible to increase the number of input channels without increasing processing time or RAM area.

Subsequently, the packets temporarily stored in RAM 204 are read at step 8.

The packets read from RAM 204 have been multiplexed. As such, the packets are reconstructed in reconstruction unit 205 at step 9 in order to deliver desired packets from the multiplexed packets to respective destinations (output channels). This reconstruction processing involves multiplying the packets read from RAM 204 by the orthogonal codes for switching previously set in orthogonal code setting registers 102-1 to 102-*m*, respectively, as shown in FIG. 2. In this event, the multiplication is performed such that a packet on a desired input channel is delivered to a desired output channel. For example, when an input CH2 packet is delivered to output channel CH1 as shown in FIG. 3, the input CH2 packet is reconstructed by multiplying the multiplexed packets with an orthogonal code for switching from among the orthogonal codes for switching that are set in orthogonal code setting registers 102-1 to 102-*m* in order to reconstruct the CH2 packet. On the other hand, when an input CHm packet is delivered to output channel CH2, the CHm packet is reconstructed by multiplying the multiplexed packets with an orthogonal code for switching from among the orthogonal codes for switching that are set in orthogonal code setting registers 102-1 to 102-*m* in order to reconstruct the CHm packet. Further, when an input CH1 packet is delivered to output channel CHn, the CH1 packet is reconstructed by multiplying the multiplexed packets with an orthogonal code for switching from among the orthogonal codes for switching that are set in orthogonal code setting registers 102-1 to 102-*m* in order to reconstruct the CH1 packet. These combinations can be freely varied by setting the appropriate orthogonal codes for switching in orthogonal code setting registers 102-1 to 102-*m*.

Each of the packets reconstructed in reconstruction unit 205 are sent to external interface conversion units 104-1 to 104-*n*, and, at their final destinations, are converted into packets in formats that conform to devices and circuits.

While a preferred embodiment of the present invention has been described in specific terms, such description is for illustrative purpose only, and it is to be understood that changes and variations may be made without departing from the spirit or scope of the following claims.

What is claimed is:

1. A multiplex switching circuit comprising:
   means for unifying bit widths of packets supplied from a plurality of input channels to a previously set bit width;
   means for establishing a synchronization among the plurality of input channels that the packets are input into, after the bit widths have been unified;
   means for spreading the synchronized packets by multiplying said packets by orthogonal codes corresponding to the input channels;
   means for multiplexing the spread packets;
   means for multiplying the multiplexed packets by an orthogonal code for switching corresponding to an input channel on which a packet delivered to an output channel has been supplied and as a result the input packet is reconstructed; and
   means for delivering the reconstructed packet to the output channel,
   wherein said previously set bit width comprises a bit width of at least a size of a largest packet that can be input from said plurality of input channels, and
   if an input packet is smaller than said previously set bit width, then residual bits of said unified bit width packets are left empty.

2. The multiplex switching circuit according to claim 1, wherein said orthogonal code and said orthogonal code for switching comprise Gold codes.

3. The multiplex switching circuit according to claim 1, wherein said orthogonal code and said orthogonal code for switching comprise Walsh-Hadamard codes.

4. The multiplex switching circuit according to claim 1, wherein said synchronization comprises reading stored packets from said plurality of input channels in accordance with a timing of an internal clock of said multiplex switching circuit.

5. The multiplex switching circuit according to claim 1, wherein, after said spread packets are multiplexed, said multiplexed packets are then stored in a random access memory (RAM) in respective time slots.

6. The multiplex switching circuit according to claim 5, wherein said multiplexed packets are processed as a single channel.

7. The multiplex switching circuit according to claim 1, wherein write timings match among said plurality of channels after bit widths of said packets have been unified.

8. The multiplex switching circuit according to claim 1, wherein said synchronization comprises reading stored packets from said plurality of input channels in accordance with a timing of an internal clock of said multiplex switching circuit.

9. A multiplex switching circuit comprising:
   a bit width conversion/synchronization first-in first-out memory unit (FIFO) for unifying bit widths of packets supplied from a plurality of input channels to a previously set bit width, and for establishing a synchronization among the plurality of input channels that the packets are input into, when the bit widths of have been unified;
   a spreading unit for spreading the packets synchronized by said bit width conversion/synchronization FIFO by multiplying said packets by orthogonal codes according to the input channels;
   a multiplexing unit for multiplexing the packets spread by said spreading unit; and
   a reconstruction unit for multiplying the packets multiplexed by said multiplexing unit by an orthogonal code for switching according to an input channel on which a packet delivered to an output channel has been supplied to as a result reconstruct the input packet, and to deliver the reconstructed packet to the output channel,
   wherein said previously set bit width comprises a bit width of at least a size of a largest packet that can be input from said plurality of input channels, and
   if an input packet is smaller than said previously set bit width, then residual bits of said unified bit width packets are left empty.

10. The multiplex switching circuit according to claim 9, wherein said orthogonal code and said orthogonal code for switching comprise Gold codes.

11. The multiplex switching circuit according to claim 9, wherein said orthogonal code and said orthogonal code for switching comprise Walsh-Hadamard codes.

12. The multiplex switching circuit according to claim 9, further comprising a generator to provide a periodically read pulse generated such that packets temporarily stored in said bit width conversion/synchronization FIFOs are simultaneously read at a time when said periodically read pulse is applied to said bit width conversion/synchronization FIFOs.

13. The multiplex switching circuit according to claim 9, wherein, after said packets spread by said spreading unit are multiplexed, said multiplexed packets are then stored in a random access memory (RAM) in respective time slots.

14. The multiplex switching circuit according to claim 13, wherein a processing time required for processing said multiplexed packets stored in said RAM comprises a processing time per channel.

15. The multiplex switching circuit according to claim 13, wherein said multiplexed packets are processed as a single channel.

16. The multiplex switching circuit according to claim 9, wherein write timings match among said plurality of channels after bit widths of said packets have been unified to said previously set bit width.

17. A switching method for multiplexing packets supplied from a plurality of channels and for delivering the packets to a plurality of output channels, the method comprising:

unifying bit widths of packets supplied from a plurality of input channels to a previously set bit width;

establishing a synchronization among the plurality of input channels that the packets are input into, the bit widths of which have been unified;

spreading the packets by multiplying the synchronized packets by orthogonal codes according to the input channels;

multiplexing the spread packets multiplied by the orthogonal codes; and multiplying the multiplexed packets by an orthogonal code for switching according to an input channel on which a packet delivered to an output channel has been supplied, wherein said previously set bit width comprises a bit width of at least a size of a largest packet that can be input from said plurality of input channels, and if an input packet is smaller than said previously set bit width, then residual bits of said unified bit width packets are left empty.

18. The method according to claim 17, wherein said orthogonal code and said orthogonal code for switching comprise Gold codes.

19. The method according to claim 17, wherein said orthogonal code and said orthogonal code for switching comprise Walsh-Hadamard codes.

20. The switching method according to claim 17, wherein said synchronization comprises reading stored packets from said plurality of input channels in accordance with a timing of an internal clock.

21. The switching method according to claim 17, said establishing a synchronization further comprising periodically generating a read pulse such that input packets are simultaneously read at a time according to said periodically generated read pulse.

22. The switching method according to claim 17, further comprising storing said multiplexed packets in a random access memory (RAM) in respective time slots.

23. The switching method according to claim 22, further comprising processing said multiplexed packets as a single channel.

* * * * *